Feb. 1, 1955 H. C. MOLENAAR 2,701,142
COLLAPSIBLE HANDCART
Filed Nov. 13, 1950 2 Sheets-Sheet 1
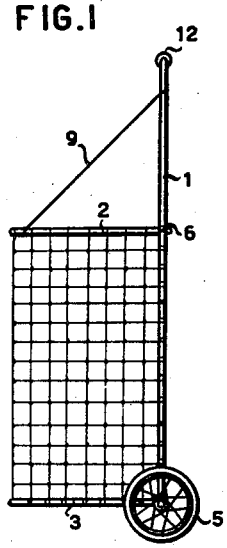
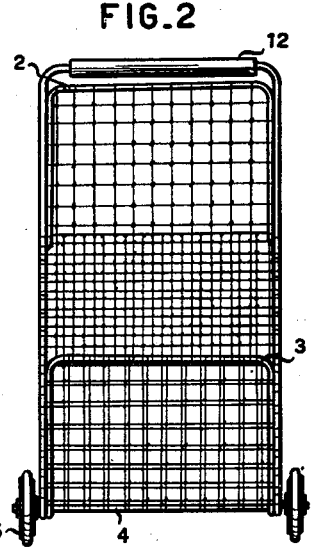
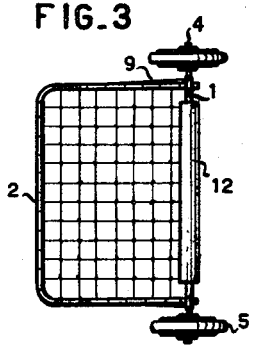
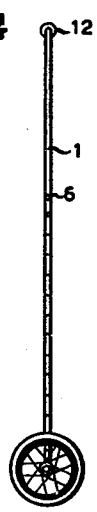
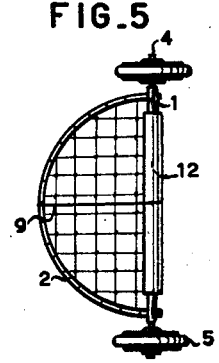
Inventor
Henri C. MOLENAAR
By
Agent

United States Patent Office 2,701,142
Patented Feb. 1, 1955

2,701,142

COLLAPSIBLE HANDCART

Henri C. Molenaar, The Hague, Netherlands

Application November 13, 1950, Serial No. 195,190

Claims priority, application Netherlands December 22, 1949

1 Claim. (Cl. 280—36)

The invention relates to improvements in collapsible hand carts, particularly for the use of shoppers carrying parcels, shoppings or similar object.

It is an object of the instant invention to provide a sturdy hand cart which requires a very small storage space when collapsed.

A further object is to so form the hand cart that relatively bulky and heavy loads are transported with ease.

Another object is to provide a hand cart that can be shipped knocked down in a comparatively small space and then readily assembled at another point.

Still another object is to provide a hand cart which is very light and which can be easily manufactured.

In the attainment of these objectives the collapsible hand cart comprises a wheeled frame provided with webs and consisting of a main frame and two parallel auxiliary frames lying at a distance above each other each of said auxiliary frames arranged for pivotal movement about an axle lying in the plane of the main frame so that, when collapsed said auxiliary frames are in the plane of the main frame, at least the part of the sides between the auxiliary frames being of a mesh web of readily deformable material. Without increasing the weight of the hand cart the meshes of the mesh web may be so small that small objects may be transported without the danger of being lost during transport. Apart from the wheels the hand cart when knocked down has a thickness substantially being equal to the thickness of the tubes or rods used for the main frame.

According to the invention the mesh wires of the mesh web may run parallel to the longitudinal direction of the main frame and perpendicular, respectively, to said direction when the cart is in its operational position. By this feature the advantage is obtained that the hand cart may be knocked down easily without unduly stretching the mesh wires.

The invention will become apparent from the following detailed description thereof contained in the annexed specification with reference to the accompanying drawings, showing by way of example some preferred embodiments of the hand cart according to the invention and in which:

Figure 1 is a side elevation of the hand cart in its unfolded position.

Figure 2 is a front elevation of the cart when collapsed.

Figure 3 is a top plan view of the cart shown in Figure 2.

Figure 4 shows the hand cart in side elevation when collapsed.

Figure 5 is a top plan view of a further embodiment.

In the different figures corresponding parts are indicated by the same reference numerals throughout.

Figure 6:
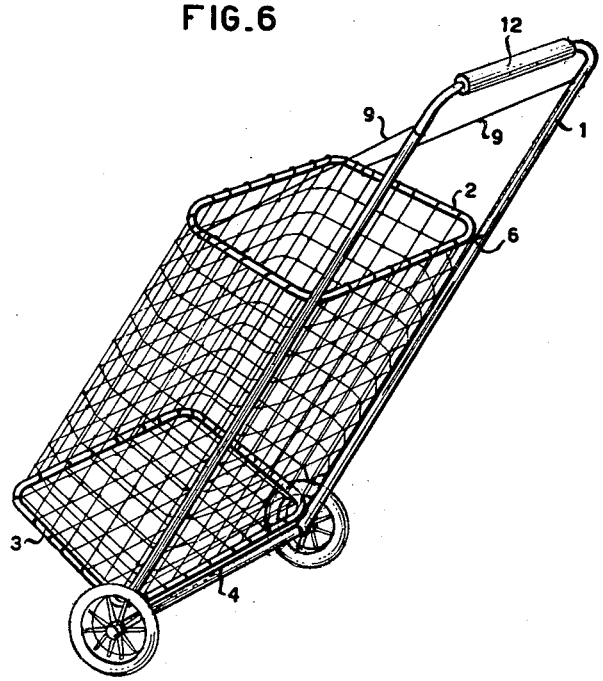
Figure 6 is a perspective view of a third embodiment.

Referring to the drawings the frame of the hand cart according to the invention comprises a main frame 1 to which two auxiliary frameworks 2 and 3 are pivotally attached. The main frame is preferably U-shaped, the ends of its legs being interconnected by an axle 4 having at its ends the wheels 5.

The upper auxiliary framework 2 may be U-shaped, the end portions of its legs being so secured hingedly to the legs of the main frame, e. g. by means of a pin 6, that said auxiliary framework may be folded in the plane of the main frame, as shown in the Figures 2 and 4. The lower auxiliary frame 3 also may be U-shaped and the end portions of its legs may be secured either hingedly to the legs of the main frame, or pivotally about the axle 4.

According to the embodiments of Figures 1–5 the end portions of the legs of the auxiliary frameworks are arranged against the innermost side of the legs of the main frame, so that said auxiliary frameworks may be entirely folded in the plane of the main frame.

Between the auxiliary frameworks 2 and 3 across part of the main frame 1 and across the lower auxiliary framework 3 there is provided a structure consisting of a network. In order that said network does not prevent the auxiliary frames from folding together and in order that it remains under tension to the same extent when being collapsed, the mesh wires should run parallel to the longitudinal direction of the main frame and perpendicular to said direction, respectively, when the hand cart is in use. The network of the lower auxiliary framework 3 and of the main frame 1 may as well be replaced by sheet material or fabric. The network of the front panel also may consist of sheet material or fabric, provided that said front panel is pivotally secured around the middle portion of the auxiliary frames.

The main frame 1 and the upper auxiliary framework 2 are interconnected by means of a chain, cable, cord, articulated rod or like member 9 of such length that the auxiliary frames are maintained substantially perpendicular to the main frame when in use. The function of said member 9 may also be fulfilled by a stop arranged on the upper auxiliary framework 2 or on the main frame 1.

Figure 6 shows an embodiment in which the auxiliary frameworks 2 and 3 each constitute a closed panel rotatably hung about the axles 6 in the main frame. In this case the stretched structure can only be provided between the auxiliary frames and across the lower auxiliary frame.

If it is desired that the middle portion of the upper auxiliary framework 2 substantially coincides in its folded position with the cross bar of the main frame 1 or with the handle 12 and if the contents of the cart should in this case be as large as possible, the auxiliary framework 2 should be mounted in the middle of the main frame, while the sides of said auxiliary framework should be of a length which is equal to half the length of the main frame.

Though the accompanying drawings and the description refer to a few embodiments, it is obvious that some details of the hand cart according to the invention may be modified without leaving the scope of the invention.

I claim:

A folding carrier comprising a wheeled main frame, an upper and a lower auxiliary frame pivoted to said main frame and foldable substantially into the plane of the main frame, and a foldable receptacle having a bottom secured to said lower frame and an open top secured to said upper frame, the complete circumference of said bottom and said top being directly connected to the respective frames of the carrier in both the open and folded position, and at least that part of the receptacle which on folding is subject to distortion being made of open mesh fabric wherein the threads of the fabric are disposed, respectively, parallel and perpendicular to the longitudinal direction of the main frame in the open position of the carrier.

References Cited in the file of this patent

UNITED STATES PATENTS

| | | |
|---|---|---|
| 834,726 | Henry | Oct. 30, 1906 |
| 1,554,034 | Richie | Sept. 15, 1925 |
| 1,718,962 | Kimball | July 2, 1929 |
| 2,061,623 | Guy | Nov. 24, 1936 |
| 2,264,121 | Pattiani | Nov. 25, 1941 |